United States Patent
Matsuno et al.

(10) Patent No.: US 7,600,373 B2
(45) Date of Patent: Oct. 13, 2009

(54) REGENERATION CONTROLLER FOR EXHAUST PURIFICATION APPARATUS OF INTERNAL COMBUSTION ENGINE

(75) Inventors: Shigehiro Matsuno, Toyota (JP);
Yasuhiko Otsubo, Toyota (JP);
Tatsuhisa Yokoi, Toyota (JP); Hiroki Matsuoka, Susono (JP); Takayoshi Inaba, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 10/548,395

(22) PCT Filed: Mar. 10, 2005

(86) PCT No.: PCT/JP2005/004732
§ 371 (c)(1),
(2), (4) Date: Sep. 8, 2005

(87) PCT Pub. No.: WO2005/088094
PCT Pub. Date: Sep. 22, 2005

(65) Prior Publication Data
US 2006/0213188 A1   Sep. 28, 2006

(30) Foreign Application Priority Data
Mar. 11, 2004   (JP) .............................. 2004-068994

(51) Int. Cl.
*F01N 3/00*   (2006.01)
(52) U.S. Cl. .............................. 60/295; 60/285; 60/286; 60/297; 60/303

(58) Field of Classification Search .................. 60/274, 60/285, 286, 295, 297, 303, 311; 422/169, 422/172, 177, 182
See application file for complete search history.

(56) References Cited

U.S. PATENT DOCUMENTS

| 5,419,121 | A  | * | 5/1995  | Sung et al. ..................... 60/274 |
| 5,974,791 | A  | * | 11/1999 | Hirota et al. ................... 60/276 |
| 6,167,696 | B1 | * | 1/2001  | Maaseidvaag et al. ........ 60/274 |
| 6,594,990 | B2 | * | 7/2003  | Kuenstler et al. ............. 60/295 |

(Continued)

FOREIGN PATENT DOCUMENTS

EP   0 903 476 A1   3/1999

(Continued)

OTHER PUBLICATIONS

Chinese Language Version of Japanese Office Action, Appln. No. 200580000129.1, dated Jul. 27, 2007.

(Continued)

*Primary Examiner*—Tu M Nguyen
(74) *Attorney, Agent, or Firm*—Kenyon & Kenyon LLP

(57) ABSTRACT

A regeneration controller that prevents overheating when performing burn-up heating for completely burning particulate matter by intermittent fuel addition to an exhaust system or intermittent increase of fuel addition to the exhaust system. The regeneration controller includes first and second exhaust temperature sensors (44, 46), each detecting the exhaust temperature at a location downstream from the exhaust purification apparatus. An ECU (70) determines the timing for stopping fuel addition to the exhaust system or increase of fuel addition to the exhaust system based on the elapsed time of fuel addition to the exhaust system or increase of fuel addition to the exhaust system.

12 Claims, 10 Drawing Sheets

U.S. PATENT DOCUMENTS

| | | |
|---|---|---|
| 6,948,311 B2 * | 9/2005 | Schaller et al. ............... 60/286 |
| 6,959,541 B2 * | 11/2005 | Kosaka et al. ................. 60/295 |
| 7,013,638 B2 * | 3/2006 | Hiranuma et al. ............. 60/286 |
| 7,047,729 B2 * | 5/2006 | van Nieuwstadt et al. ..... 60/286 |
| 7,086,220 B2 * | 8/2006 | Imai et al. ..................... 60/274 |
| 7,111,455 B2 * | 9/2006 | Okugawa et al. ............. 60/295 |
| 7,310,941 B2 * | 12/2007 | Kuboshima et al. ........... 60/297 |
| 2006/0107649 A1 | 5/2006 | Kamikawa et al. |
| 2007/0169466 A1 * | 7/2007 | Yokoi et al. .................... 60/277 |

FOREIGN PATENT DOCUMENTS

| | | |
|---|---|---|
| FR | 2 829 526 | 3/2003 |
| JP | 60-090952 | 5/1985 |
| JP | 04-047118 | 2/1992 |
| JP | 05-240024 | 9/1993 |
| JP | 10-274030 | 10/1998 |
| JP | 2002-227630 | 8/2002 |
| JP | 2002-227688 | 8/2002 |
| JP | 2002-303175 | 10/2002 |
| JP | 2002-332822 | 11/2002 |
| JP | 2003-020930 | 1/2003 |
| JP | 2003-286878 | 10/2003 |
| JP | 2003-286907 | 10/2003 |
| JP | 2004-028030 | 1/2004 |
| JP | 2004-036405 | 2/2004 |
| JP | 2004-183525 | 7/2004 |
| WO | WO 02/38932 A1 | 5/2002 |
| WO | WO 0238932 A1 * | 5/2002 |
| WO | WO 2004018850 | 3/2004 |

OTHER PUBLICATIONS

English Translation of Chinese Office Action, Appln. No. 200580000129.1, dated Jul. 27, 2007.

* cited by examiner

REGENERATION CONTROLLER FOR EXHAUST PURIFICATION APPARATUS OF INTERNAL COMBUSTION ENGINE

This is a 371 national phase application of PCT/JP05/04732 filed 10 Mar. 2005, claiming priority to Japanese Patent Application No. 2004-068994 filed 11 Mar. 2004, the contents of which are incorporated herein by reference.

TECHNICAL FIELD

The present invention relates to a regeneration controller that performs burn-up heating for completely burning particulate matter accumulated in an exhaust purification apparatus, which is arranged in the exhaust system of an internal combustion engine.

BACKGROUND ART

Japanese Laid-Open Patent Publication No. 2003-20930 describes a technique for burning and eliminating particulate matter (PM) accumulated in a filter, which is arranged in the exhaust system of a diesel engine, when the amount of PM accumulated in the filter exceeds a predetermined amount. The PM accumulated in the filter is burned and eliminated by heating the filter and intermittently adjusting the air-fuel ratio to the lean side. To be specific, the air-fuel ratio is intermittently adjusted to the lean side by intermittently adding fuel to the exhaust (intermittent fuel addition). In some cases, the air-fuel ratio may be intermittently adjusted to the lean side by intermittently increasing the amount of fuel supplied to the exhaust (intermittent increase of fuel addition).

In this prior art arrangement for eliminating PM, the amount of active oxygen is adjusted by changing the fuel supply interval based on the PM accumulation amount. In this way, the PM is eliminated through oxidation while fuel efficiency is prevented from decreasing. In this prior art arrangement, however, the temperature of the filter is not taken into consideration when the fuel supply interval is changed. Thus, depending on the clogging degree of the filter or the driving state of the diesel engine, the filter may be overheated. This would cause thermal deterioration of the filter.

To avoid this, the interval for supplying fuel needs to be adjusted based on the temperature of the exhaust that passed through the filter. However, the temperature of the filter does not increase immediately after the fuel supply to the exhaust system is started. Further, the temperature of the filter does not decrease immediately after the fuel supply to the exhaust system is stopped. That is, a time delay exists between when the fuel supply is started or stopped and when the temperature of the filter changes. Such a temperature characteristic differs depending on the deterioration degree of the catalyst in the filter.

Thus, if the fuel supply to the exhaust system is simply controlled based on the temperature of the exhaust that passed through the filter, the filter may be overheated. For example, although the fuel supply is stopped assuming that there is still time before the filter is overheated, the temperature of the filter further increase and the filter may be overheated.

When the sensor detecting the temperature of the exhaust deteriorates, or when the exhaust discharged from the filter flows unevenly, the detection response of the temperature of the exhaust that has passed through the filter may be delayed or the detection accuracy of the temperature of the exhaust that passed through the filter may be degraded. In such a case, the fuel supply is controlled based on a detection value differing from the actual temperature of the exhaust. As a result, the fuel supply is started or stopped at inappropriate timings. This may cause the filter to be overheated.

In particular, when burn-up heating for completely burning PM is performed by intermittent fuel addition to the exhaust system or intermittent increase of fuel addition to the exhaust system, overheating of the exhaust purification apparatus caused by the time delay of the temperature increase or the detection error of the temperature is remarkable.

SUMMARY OF THE INVENTION

It is an object of the present invention to provide a regeneration controller that prevents overheating when performing burn-up heating for completely burning particulate matter by intermittent fuel addition to an exhaust system or intermittent increase of fuel addition to the exhaust system.

One aspect of the present invention is a regeneration controller for an exhaust purification apparatus that is arranged in an exhaust system of an internal combustion engine. The regeneration controller burns particulate matter in the exhaust purification apparatus by intermittently adding fuel to the exhaust system or intermittently increasing the amount of fuel added to the exhaust system. The regeneration controller includes an exhaust temperature detector for detecting exhaust temperature at a location downstream from the exhaust purification apparatus. A stop timing determination section determines a timing for stopping the fuel addition to the exhaust system or the increase of fuel addition to the exhaust system based on the exhaust temperature detected by the exhaust temperature detector and an elapsed time of the fuel addition to the exhaust system or the increase of fuel addition to the exhaust system.

Another aspect of the present invention is a regeneration controller for an exhaust purification apparatus that is arranged in an exhaust system of an internal combustion engine. The regeneration controller burns particulate matter in the exhaust purification apparatus by intermittently adding fuel to the exhaust system or by intermittently increasing the amount of fuel added to the exhaust system. The regeneration controller includes an exhaust temperature detector for detecting exhaust temperature at a location downstream from the exhaust purification apparatus. A start timing determination section determines a timing for starting the fuel addition to the exhaust system or the increase of fuel addition to the exhaust system based on the exhaust temperature detected by the exhaust temperature detector and an elapsed time in which there is no fuel addition to the exhaust system or in which there is no increase of fuel addition to the exhaust system.

A further aspect of the present invention is a regeneration controller for an exhaust purification apparatus that is arranged in an exhaust system of an internal combustion engine. The regeneration controller burns particulate matter in the exhaust purification apparatus by intermittently adding fuel to the exhaust system or by intermittently increasing the amount of fuel added to the exhaust system. The regeneration controller includes an exhaust temperature detector for detecting exhaust temperature at a location downstream from the exhaust purification apparatus. A stop timing determination section determines a timing for stopping the fuel addition to the exhaust system or the increase of fuel addition to the exhaust system based on the exhaust temperature detected by the exhaust temperature detector and an elapsed time of the fuel addition to the exhaust system or the increase of fuel addition to the exhaust system. A start timing determination section determines a timing for starting the fuel addition to the exhaust system or the increase of fuel addition to the exhaust system based on the exhaust temperature detected by the exhaust temperature detector and an elapsed time in which there is no fuel addition to the exhaust system or in which there is no increase of fuel addition to the exhaust system.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

BEST MODE FOR CARRYING OUT THE INVENTION

Figure 1:
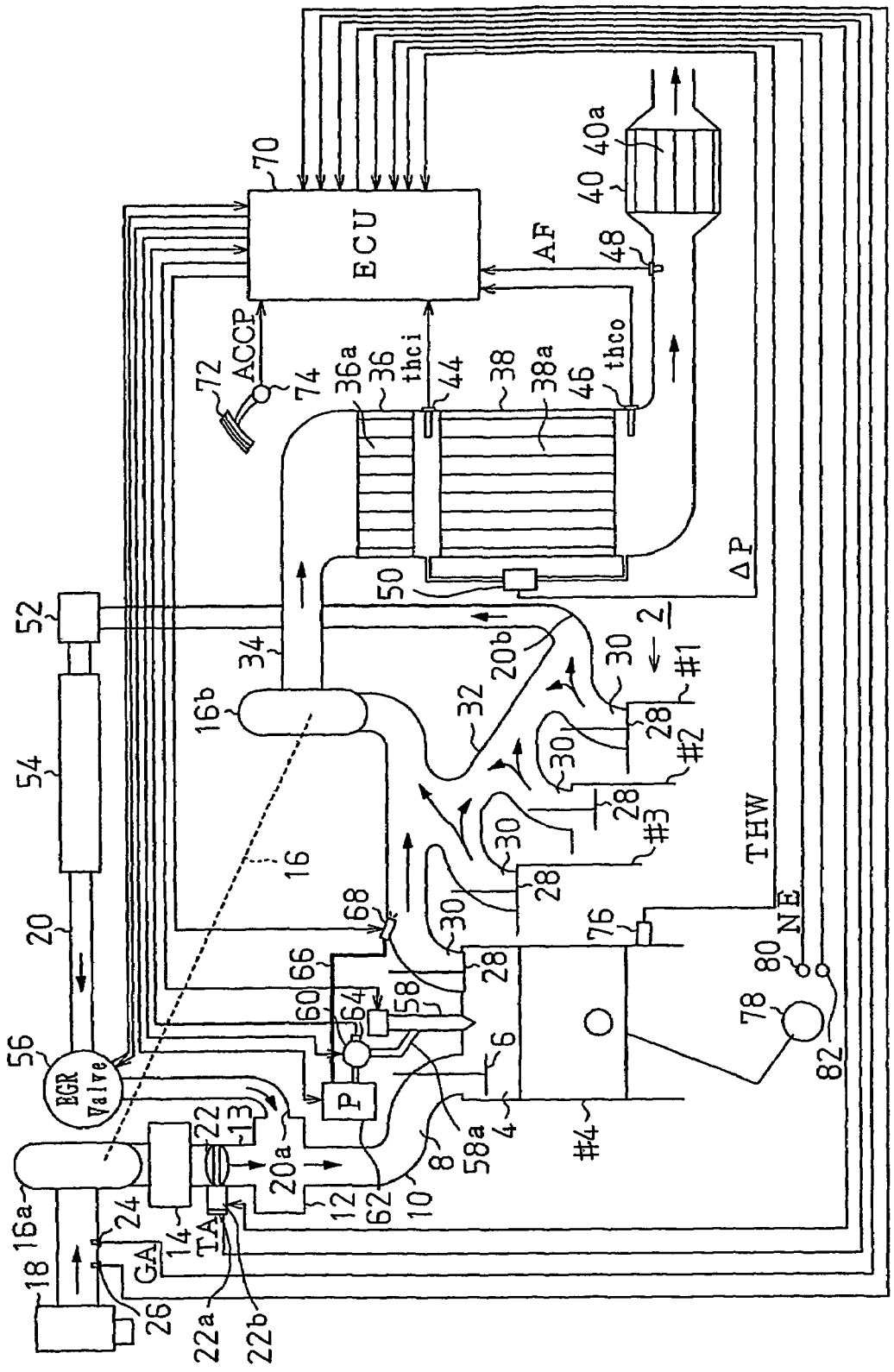
FIG. 1 is a schematic diagram of a control system for a vehicle diesel engine according to a first embodiment of the present invention.

A regeneration controller for an exhaust purification apparatus of an internal combustion engine according to a first embodiment of the present invention will now be discussed. FIG. 1 is a schematic diagram of a control system including the regeneration controller, which is applied to a vehicle diesel engine. The application of the regeneration controller of the present invention is not limited to a diesel engine. That is, the regeneration controller of the present invention is also applicable to a lean-burn gasoline engine.

A diesel engine 2 includes a plurality of cylinders including first to fourth cylinders #1, #2, #3, and #4. In each of the cylinders #1 to #4, a combustion chamber 4 is connected to a surge tank 12 via an intake port 8 and an intake manifold 10. Each intake port 8 is opened and closed by an intake valve 6. The surge tank 12 is connected to an intercooler 14 and a supercharger such as an exhaust turbocharger 16. Fresh air supplied via an air cleaner 18 is compressed by a compressor 16a of the exhaust turbocharger 16. The surge tank 12 has an EGR gas supply port 20a of an exhaust gas recirculation (EGR) passage 20. A throttle valve 22 is arranged in an intake passage 13 between the surge tank 12 and the intercooler 14. An intake air amount sensor 24 and an intake air temperature sensor 26 are arranged between the compressor 16a and the air cleaner 18.

In each of the cylinders #1 to #4, the combustion chamber 4 is connected to an exhaust port 30 and an exhaust manifold 32. Each exhaust port 30 is opened and closed by an exhaust valve 28. An exhaust turbine 16b of the exhaust turbocharger 16 is arranged between the exhaust manifold 32 and the exhaust passage 34. The exhaust is sent into the exhaust turbine 16b from a position in the exhaust manifold 32 close to the fourth cylinder #4.

Three exhaust purification mechanisms, each accommodating an exhaust purification catalyst, namely, catalytic converters 36, 38, and 40, are arranged in the exhaust passage 34. The first catalytic converter 36 (first exhaust purification apparatus), which is positioned the furthest upstream, accommodates a NOx storage reduction catalyst 36a. When the exhaust of the diesel engine 2, which is operating normally, is in an oxidation atmosphere (lean), NOx is stored in the NOx storage reduction catalyst 36a. When the exhaust is in a reduction atmosphere (stoichiometric or air-fuel ratio being lower than that the stoichiometric condition), the NOx stored in the NOx storage reduction catalyst 36a is reduced to NO, separated from the NOx storage reduction catalyst 36a, and further reduced using HC and CO. In this way, NOx is eliminated.

The second catalytic converter 38 (second exhaust purification apparatus), which is arranged downstream from the first catalytic converter 36, accommodates a filter 38a having a monolithic structure. Walls of the filter 38a have pores that permit the passage of exhaust. The porous wall surface of the filter 38a is coated with a layer of a NOx storage reduction catalyst. The filter 38a functions as a base for the NOx storage reduction catalyst layer. The NOx storage reduction catalyst layer eliminates NOx in the same manner as the NOx storage reduction catalyst 36a. Particulate matter (PM) contained in the exhaust is accumulated in the wall of the filter 38a. The PM is first oxidized by active oxygen released when NOx is exposed in an oxidation atmosphere under a relatively high temperature. Then, the PM is entirely oxidized by the surrounding excess oxygen. In this way, not only NOx but also PM is eliminated from the filter 38a. The first catalytic converter 36 is formed integrally with the second catalytic converter 38.

The third catalytic converter 40, which is positioned the farthest downstream, accommodates an oxidation catalyst 40a for eliminating HC and CO through oxidation. A first exhaust temperature sensor 44 is arranged between the NOx storage reduction catalyst 36a and the filter 38a. Between the filter 38a and the oxidation catalyst 40a, a second exhaust temperature sensor 46 is arranged near the filter 38a, and an air-fuel ratio sensor 48 is arranged near the oxidation catalyst 40a.

The air-fuel ratio sensor 48 is, for example, a sensor using a solid electrolyte. The air-fuel ratio sensor 48 detects the air-fuel ratio of the exhaust based on exhaust components and generates a voltage signal, which is linearly proportional to the air-fuel ratio. The first exhaust temperature sensor 44 and the second exhaust temperature sensor 46 respectively detect exhaust temperatures thci and thco at their respective locations.

A pressure difference sensor 50 is connected to a pipe connecting the upstream side and downstream side of the filter 38a. The pressure difference sensor 50 detects the pressure difference $\Delta P$ between the upstream and downstream sides of the filter 38a to detect the clogging degree of the filter 38a, that is, the degree of accumulation of PM in the filter 38a.

The exhaust manifold 32 has an EGR gas inlet 20b of the EGR passage 20 located near the first cylinder #1, or distant from the fourth cylinder #4 that sends exhaust into the exhaust turbine 16b.

A steel EGR catalyst 52 for reforming the EGR gas, a cooler 54 for cooling the EGR gas, and an EGR valve 56 are arranged in the EGR passage 20 in this order from the EGR gas inlet 20b. The EGR catalyst 52 also functions to prevent clogging of the cooler 54. The amount of EGR gas that is to be supplied again to the intake system via the EGR gas supply port 20a is adjusted according to the opening degree of the EGR valve 56.

A fuel injection valve 58 is arranged in each of the cylinders #1 to #4 and directly injects fuel into the corresponding combustion chamber 4. Each fuel injection valve 58 is connected to a common rail 60 via a fuel supply pipe 58a. A variable discharge amount fuel pump 62, which is electrically controlled, supplies high-pressure fuel into the common rail 60. The high-pressure fuel in the common rail 60 is distributed to the corresponding fuel injection valve 58 via each fuel supply pipe 58a. A fuel pressure sensor 64 detects the pressure of fuel in the common rail 60.

The fuel pump 62 supplies low-pressure fuel to a fuel adding valve 68 via a fuel supply pipe 66. The fuel adding valve 68 is arranged in an exhaust port 30 of the fourth cylinder #4 to inject fuel toward the exhaust turbine 16b. The fuel adding valve 68 adds fuel to the exhaust in a catalyst control mode.

An electronic control unit (ECU) 70 includes a digital computer system including a CPU, a ROM, a RAM, and drive circuits. The drive circuit drives various units. The ECU 70 is provided with detection signals from the intake air amount sensor 24, the intake air temperature sensor 26, the first exhaust temperature sensor 44, the second exhaust temperature sensor 46, the air-fuel ratio sensor 48, the pressure difference sensor 50, an EGR opening degree sensor included in the EGR valve 56, a fuel pressure sensor 64, a throttle opening degree sensor 22a, an accelerator opening degree sensor 74, a coolant temperature sensor 76, an engine speed sensor 80, and a cylinder distinction sensor 82. The accelerator opening degree sensor 74 detects the depressed amount of an accelerator pedal 72 (accelerator opening degree ACCP). The coolant temperature sensor 76 detects the coolant temperature THW of the diesel engine 2. The engine speed sensor 80 detects the engine speed NE, or rotation speed of the crankshaft 78. The cylinder distinction sensor 82 detects the rotational phase of the crankshaft 78 or the rotational phase of an intake cam to distinguish cylinders.

The ECU 70 determines the driving state of the engine from these detection signals to control fuel injection (amount and timing) of the fuel injection valves 58 according to the driving state of the engine. The ECU 70 executes control for adjusting the opening degree of the EGR valve 56, adjusting the throttle opening degree with a motor 22b, and adjusting the discharge amount of the fuel pump 62. Further, the ECU 70 executes catalyst control including a regeneration mode, a sulfur components decomposition-release mode (hereinafter referred as a sulfur elimination mode), a NOx reduction mode, and a normal control mode. The catalyst control will be described later.

The ECU 70 executes a combustion mode selected from two combustion modes, namely, a normal combustion mode and a low temperature combustion mode, according to the driving state of the engine. In the low temperature combustion mode, the ECU 70 simultaneously reduces NOx and smoke by slowing the increase of the combustion temperature by using a large recirculation amount of exhaust based on an EGR valve opening degree map for the low temperature combustion mode. The low temperature combustion mode is executed when the engine is in a range in which the engine load is low and the engine speed is low or intermediate. In the low temperature combustion mode, the ECU 70 executes air-fuel ratio feedback control including adjustment of a throttle opening degree TA based on the air-fuel ratio AF detected by the air-fuel ratio sensor 48. A combustion mode other than the low temperature combustion mode is the normal combustion mode. In the normal combustion mode, the ECU 70 executes normal EGR control (including control that involves no recirculation of the exhaust) based on an EGR valve opening degree map for the normal combustion mode.

The catalyst control will now be described.

In the regeneration mode, the ECU 70 particularly heats PM accumulated in the filter 38a of the second catalytic converter 38 when the estimated accumulation amount of PM in the exhaust purification catalyst reaches a regeneration reference value. The PM is heated to be oxidized and decomposed to generate $CO_2$ and $H_2O$ and is released as $CO_2$ and $H_2O$ (PM release heating). In the regeneration mode, the ECU 70 repeatedly adds fuel with the fuel adding valve 68 to heat (e.g., 600 to 700° C.) the catalyst bed at an air-fuel ratio that is higher than the stoichiometric air-fuel ratio. The ECU 70 may further perform fuel injection (after injection) in each combustion chamber 4 with the corresponding fuel injection valve 58 during the power stroke or the exhaust stroke. The ECU 70 further executes burn-up heating by executing an intermittent fuel adding process. In the intermittent fuel adding process, the ECU 70 executes an air-fuel ratio lowering process in between periods in which no fuel is added. The air-fuel ratio lowering process lowers (enriches) the air-fuel ratio to be the same as or slightly lower than the stoichiometric air-fuel ratio by intermittently adding fuel from the fuel adding valve 68. In this embodiment, the air-fuel ratio lowering process causes the air-fuel ratio to be slightly lower than the stoichiometric air-fuel ratio. In certain cases, the after injection with the fuel injection valves 58 and the intermittent fuel adding process may be performed in combination. The regeneration mode functions to completely burn (burn-up) the PM. Thus, the PM clogging at the front surface of the NOx storage reduction catalyst 36a is eliminated, and the PM accumulated in the filter 38a is burned.

The sulfur elimination mode is executed when the NOx storage reduction catalyst 36a and the filter 38a are poisoned by sulfur components and their exhaust purification capacity such as NOx storage capacity is lowered. The sulfur elimination mode decomposes and releases sulfur components from the NOx storage reduction catalyst 36a and the filter 38a so that the NOx storage reduction catalyst 36a and the filter 38a are rid of sulfur components and restored from sulfur poisoning. In the sulfur elimination mode, the ECU 70 heats the catalyst bed (e.g., to 650° C.) by repeatedly adding fuel from the fuel adding valve 68. The ECU 70 further executes an air-fuel ratio lowering process that lowers the air-fuel ratio to be the same as or slightly lower than the stoichiometric air-fuel ratio by intermittently adding fuel from the fuel adding valve 68. In the first embodiment, the air-fuel ratio lowering process enriches the air-fuel ratio to be slightly lower than the stoichiometric air-fuel ratio. In the sulfur elimination mode, the after injection using the fuel injection valve 58 may also be executed. This process is similar to the intermittent fuel adding process executed in the regeneration mode and also has the effect of burning up the PM.

In the NOx reduction mode, NOx occluded in the NOx storage reduction catalyst 36a and the filter 38a is reduced to $N_2$, $CO_2$, and $H_2O$, and is released as $N_2$, $CO_2$, and $H_2O$. In the NOx reduction mode, the ECU 70 intermittently adds fuel from the fuel adding valve 68 at relatively long time intervals so that the temperature of the catalyst bed is set relatively low (e.g., 250 to 500° C.). At such a relatively low catalyst bed temperature, the air-fuel ratio is lowered to be the same as or slightly lower than the stoichiometric air-fuel ratio.

The catalyst control excluding the three catalyst control modes described above is the normal control mode. In the normal control mode, the ECU 70 does not perform the fuel addition with the fuel adding valve 68 and the after injection with the fuel injection valve 58.

Figure 2:
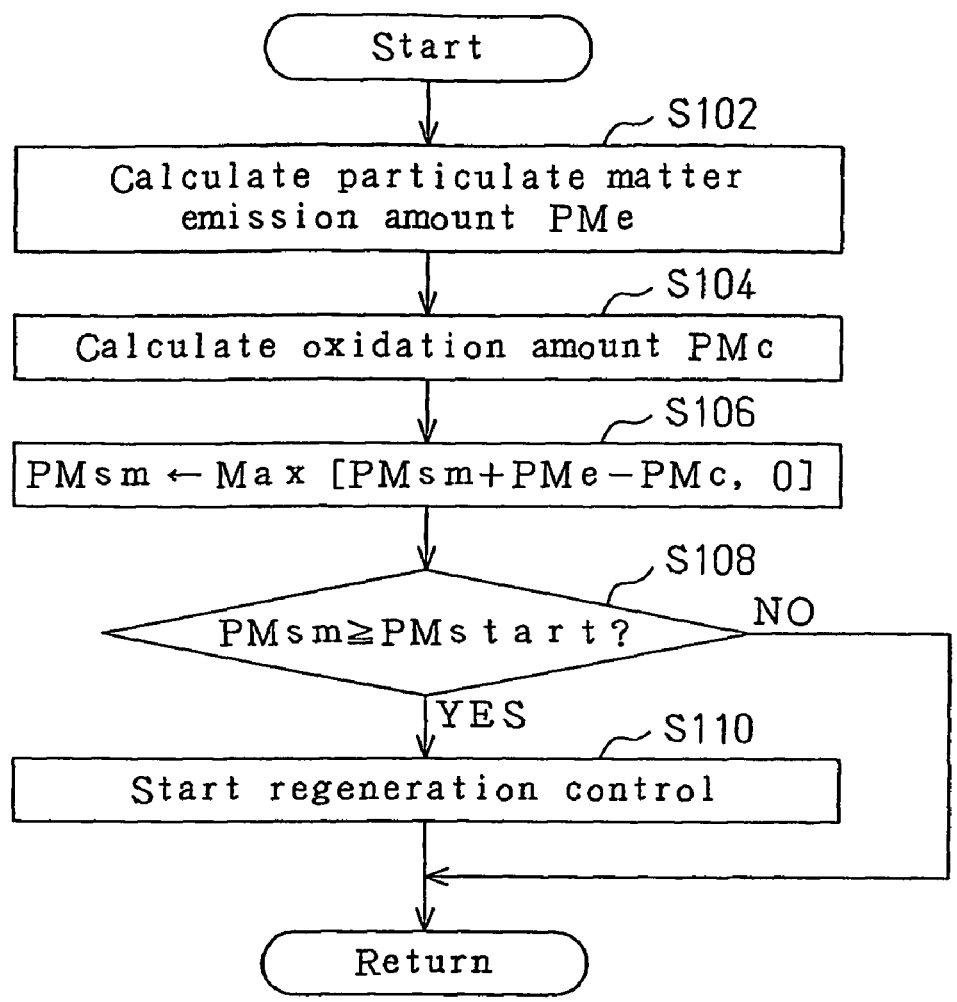
FIG. 2 is a flowchart of a regeneration mode execution determination executed by the ECU shown in FIG. 1.
Figure 3:
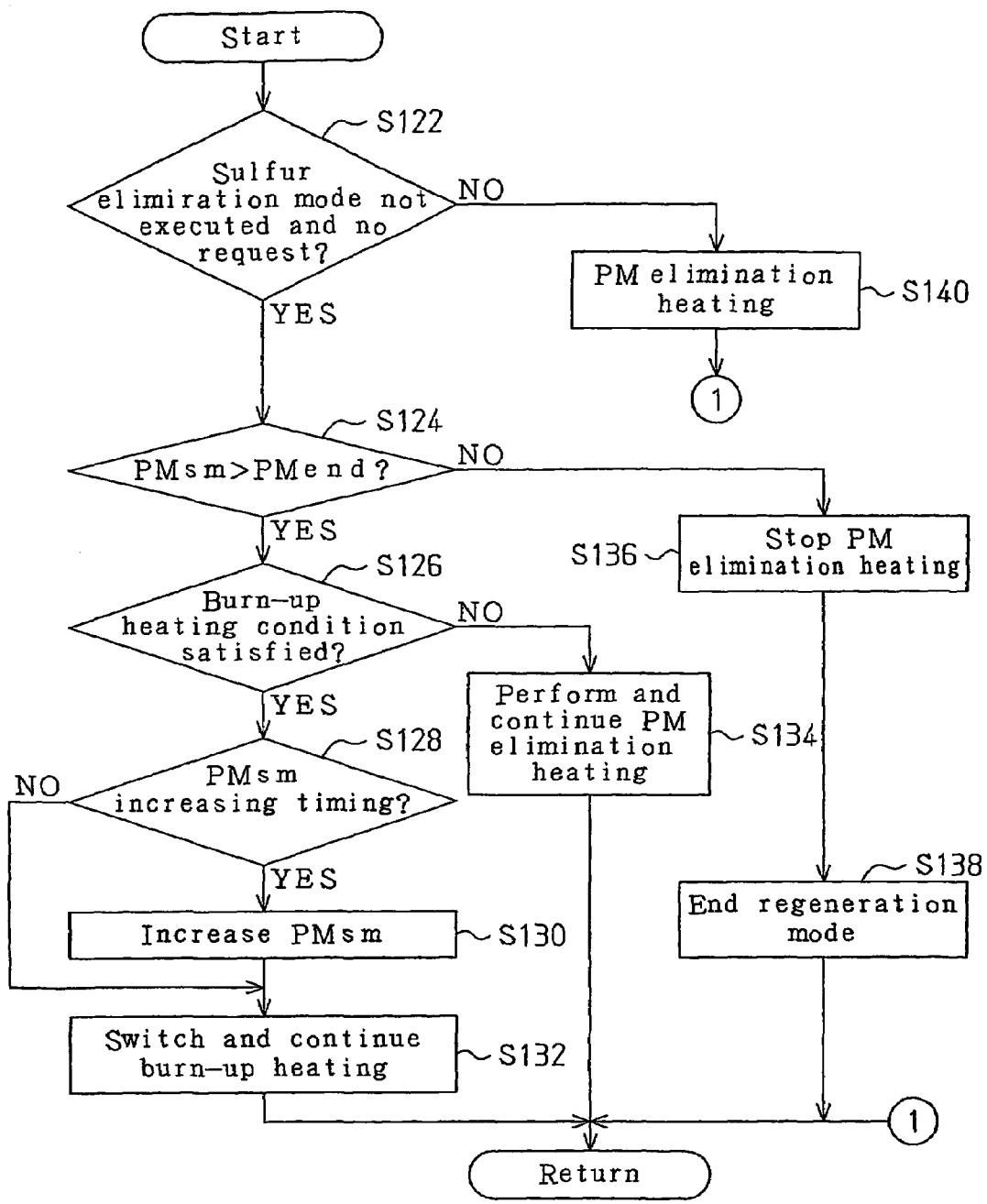
FIG. 3 is a flowchart of regeneration control executed by the ECU shown in FIG. 1.
Figure 4:
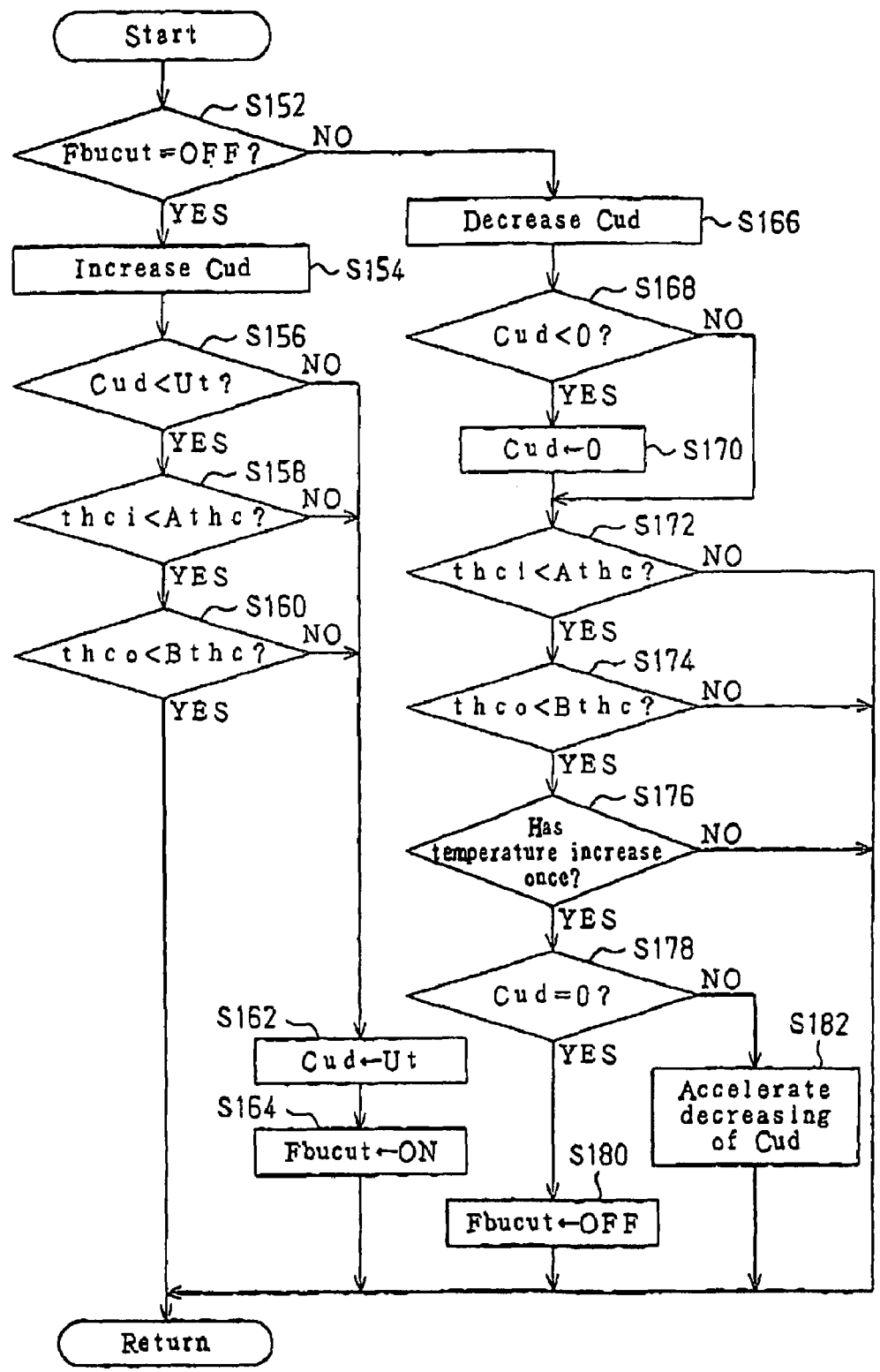
FIG. 4 is a flowchart of burn-up heating performed by the ECU shown in FIG. 1.

The processing executed by the ECU 70 in the regeneration mode will now be discussed. The flowchart of FIG. 2 showing the regeneration mode execution determination, the flowchart of FIG. 3 showing the regeneration control, and the flow chart of FIG. 4 showing burn-up heating are each executed as interrupts in predetermined time cycles. The result of the regeneration mode execution determination in FIG. 2 determines whether to start the regeneration control in FIG. 3 and the burn-up heating in FIG. 4.

The regeneration mode execution determination (FIG. 2) will first be described. In step S102, the ECU 70 calculates the particulate matter emission amount PMe, which is the total amount of PM emitted from each combustion chamber 4 of the diesel engine 2 during one control cycle in FIG. 2. In this embodiment, the ECU 70 calculates the particulate matter emission amount PMe by referring to a map, which is generated in advance through experiments. The map associates the emission amount with, for example, the engine speed NE and with the engine load (e.g., the fuel injection amount of the fuel injection valve 58). The ECU 70 calculates the particulate matter emission amount PMe from the engine speed NE and the engine load.

In step S104, the ECU 70 calculates the oxidation amount PMc of PM that is accumulated or trapped in the filter 38a. The oxidation amount PMc is the amount of the trapped PM that is eliminated through oxidation during one control cycle of this process. In this embodiment, the ECU 70 calculates the oxidation amount PMc by referring to a map, which is generated in advance through experiments. The map associates the oxidation amount with the catalyst bed temperature of the filter 38a (e.g., the exhaust temperature thco detected by the second exhaust temperature sensor 46) and with an intake air amount GA. The ECU 70 calculates the oxidation amount PMc from the exhaust temperature thco and the intake air amount GA.

In step S106, the ECU 70 calculates an estimated PM accumulation amount PMsm using expression 1.

$$PMsm \leftarrow Max[PMsm+PMe-PMc, 0] \quad (1)$$

In expression 1, the estimated accumulation amount PMsm in the right side is the value calculated in the previous cycle of this process. Max represents an operator for extracting the maximum value of the values in the parentheses. For example, when PMsm+PMe−PMc is a positive value, the resulting value of PMsm+PMe−PMc is set as the estimated accumulation amount PMsm at the left side of the expression. When PMsm+PMe−PMc is a negative value, zero (grams) is set as the estimated accumulation amount PMsm at the left side of the expression.

In step S108, the ECU 70 checks whether the estimated accumulation amount PMsm is greater than or equal to a regeneration reference value PMstart and determines whether to start the regeneration mode. When PMsm is less than PMstart (NO in step S108), the ECU 70 temporarily terminates this process. The state in which PMsm is less than PMstart corresponds to a state before timing t0 shown in the timing chart of FIG. 5.

When the state in which PMe is greater than PMc continues due to the driving state of the diesel engine 2, steps S102, S104, and S106 are repeated. This gradually increases the estimated accumulation amount PMsm. However, as long as PMsm is less than PMstart (NO in step S108), the ECU 70 temporarily terminates this process.

Figure 5:
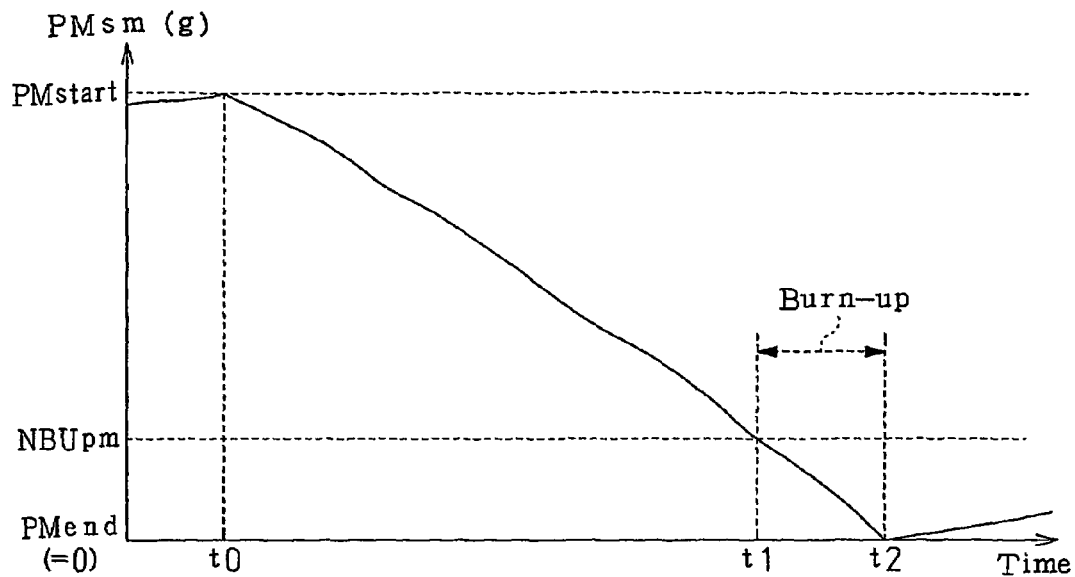
FIGS. 5 to 9 are timing charts of the regeneration control in the first embodiment.

When the estimated accumulation amount PMsm increases and satisfies PMsm≧PMstart (YES in step S108), in step S110, the ECU 70 starts the regeneration control (t0 in FIG. 5). In this case, the regeneration control of FIG. 3 is performed cyclically.

The regeneration control will now be described with reference to FIG. 3. The ECU 70 executes the regeneration control after executing the regeneration mode execution determination in FIG. 2. Thus, the regeneration control is executed in the same cycle as the regeneration mode execution determination.

In step S122, the ECU 70 determines whether the sulfur elimination mode is presently not being executed and whether the sulfur elimination mode has not been requested. When the sulfur elimination mode is being executed or when the sulfur elimination mode has been requested (NO in S122), the PM is burned in the sulfur elimination mode. Thus, if the sulfur elimination mode is being executed, the ECU 70 stops the PM elimination heating in step S140, and temporarily terminates this process.

When the sulfur elimination mode is not being executed and the sulfur elimination mode has not been requested (YES in S122), the ECU 70 determines whether the estimated accumulation amount PMsm is greater than a termination determination value PMend (e.g., 0 grams) in step S124. When PMsm is greater than PMend (YES in S124), the ECU 70 determines whether the condition for performing the burn-up heating shown in FIG. 4 is satisfied in step S126.

The ECU 70 performs the burn-up heating when any one of conditions (1) and (2) is satisfied.

(1) The estimated accumulation amount PMsm is less than or equal to a normal burn-up start determination value NBUpm (FIG. 5), which is slightly greater than the PM termination determination value PMend (e.g., 0 grams).

(2) The ratio ΔP/GA is greater than or equal to a reference value, which indicates PM clogging, and the estimated accumulation amount PMsm is less than or equal to a special burn-up start determination value SBUpm, which is slightly greater than the PM termination determination value PMend. The special burn-up start determination value SBUpm is greater than the normal burn-up start determination value NBUpm.

When neither of conditions (1) and (2) is satisfied, the ECU 70 performs normal heating for PM elimination in step S134. To be specific, the ECU 70 repeatedly adds fuel from the fuel adding valve 68 so that the air-fuel ratio of the exhaust becomes higher than the stoichiometric air-fuel ratio and the catalyst bed temperature (exhaust temperature thci) increases (e.g., to 600 to 700° C.). This processing causes the particulate matter emission amount PMe to become less than the oxidation amount PMc. Thus, the estimated accumulation amount PMsm decreases gradually (refer to expression 1). Accordingly, the estimated accumulation amount PMsm continues to decrease after timing t0 as shown in FIG. 5.

Afterwards, when condition (1) is satisfied (YES in S126), the ECU 70 determines whether this is the timing at which the estimated accumulation amount PMsm is to be increased in step S128. In this embodiment, the timing at which condition (2) is satisfied is set as the timing at which the estimated accumulation amount PMsm is to be increased. Thus, when only condition (1) is satisfied in step S126, the ECU 70 determines step S128 as NO. In step S132, the ECU 70 switches the PM elimination heating to burn-up heating for burning up PM, and temporarily terminates this process. In this way, the ECU 70 starts the burn-up heating shown in FIG. 4. In the burn-up heating, the PM clogging at the front surface of the NOx storage reduction catalyst 36a is eliminated, and the PM accumulated in the filter 38a is burned up. In step S132, the estimated accumulation amount PMsm is less than or equal to the normal burn-up start determination value NBUpm, that is, the amount of PM in the NOx storage reduction catalyst 36a and the filter 38a is relatively small. Thus, there would be no problems even if the burn-up heating is performed and PM is burned rapidly.

Figure 6:
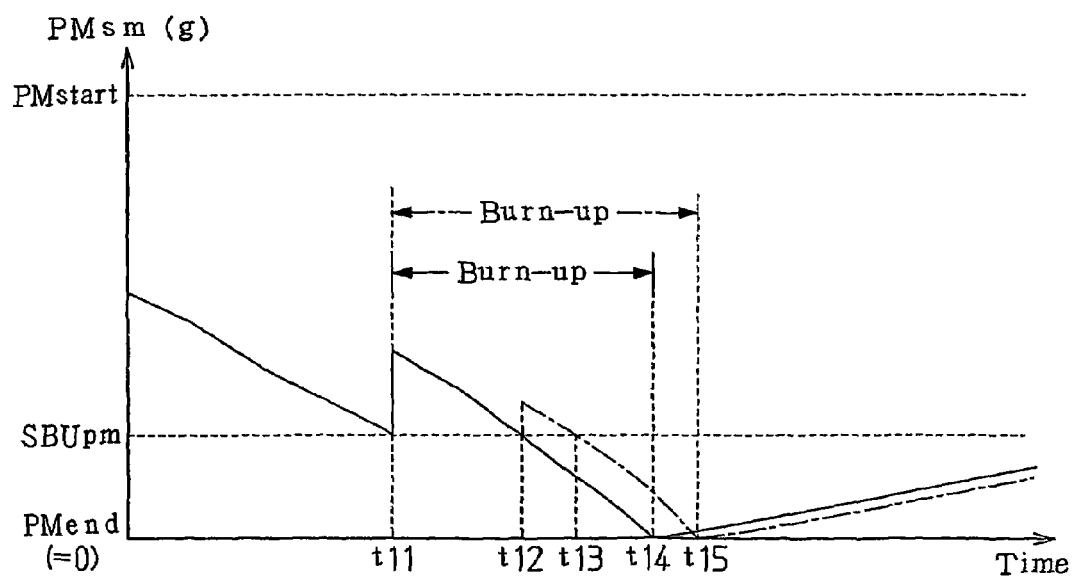

When condition (2) is satisfied in step S126 (YES in S126), the ECU 70 determines whether this is the timing at which the estimated accumulation amount PMsm is to be increased in step S128. The determination in step S128 results in YES. The ECU 70 increases the estimated accumulation amount PMsm in step S130. As a result, the estimated accumulation amount PMsm becomes greater than the special burn-up start determination value SBUpm as shown in FIG. 6. In step S132, the ECU 70 switches the processing to burn-up heating. The estimated accumulation amount PMsm is less than or equal to the special burn-up start determination value SBUpm, and the amount of PM in the NOx storage reduction catalyst 36a and the filter 38a is relatively small. Thus, there would be no problems even if the burn-up heating is performed and PM is burned rapidly. As shown at timing t12 in FIG. 6, when the condition for performing the burn-up heating is satisfied again in step S126, the ECU 70 increases the estimated accumulation amount PMsm again in step S130 as indicated by the broken line. The number of times the estimated accumulation amount PMsm increasing process (S130) is executed is limited to twice. Accordingly, even if the burn-up heating perform condition is satisfied for the third time at timing t13 in FIG. 6, the ECU 70 determines step S126 as NO.

Once the burn-up heating starts, the ECU 70 continues the burn-up heating (S134) even if the burn-up heating perform condition becomes unsatisfied (NO in S126), that is, even if, for example, the ratio ΔP/GA becomes less than the reference value, which indicates PM clogging.

Afterwards, when determining that the estimated accumulation amount PMsm is less than or equal to the termination determination value PMend in step S124, the ECU 70 stops the PM elimination heating in step S136. In this way, the burn-up heating is stopped and the regeneration mode is completed (S138, t2 in FIG. 5, t14 and t15 in FIG. 6).

The burn-up heating of FIG. 4 will now be described. First, the ECU 70 determines whether an addition prohibition flag Fbucut is OFF in step S152. When the addition prohibition flag Fbucut is OFF, the ECU 70 adds fuel to the exhaust from the fuel adding valve 68 to perform burn-up heating unless the fuel addition is prohibited due to other conditions, such as the driving state of the engine. When the addition prohibition flag Fbucut is ON, the ECU 70 stops fuel addition from the fuel adding valve 68. With the addition prohibition flag Fbucut set ON or OFF, fuel is intermittently added to the exhaust and the burn-up heating is performed.

When the addition prohibition flag Fbucut is OFF (YES in S152), the ECU 70 determines that fuel is presently being added. In this case, in step S154, the ECU 70 increases (e.g., increments) an addition period count value Cud, which is set in the memory of the ECU 70.

In step S156, the ECU 70 determines whether the addition period count value Cud is less than a maximum value Ut. In the initial stage of the control, the addition period count value Cud is less than the maximum value Ut (YES in S156). In step S158, the ECU 70 determines whether the exhaust temperature thci detected by the first exhaust temperature sensor 44 at a location downstream from the NOx storage reduction catalyst 36a is less than a stop determination reference temperature Athc (e.g., 540° C.).

When thci<Athc is satisfied (YES in S158), the ECU 70 determines whether the exhaust temperature thco detected by the second exhaust temperature 46 at a location downstream from the filter 38a is less than a stop determination reference temperature Bthc (e.g., 600° C.) in step S160.

When thco<Bthc is satisfied (YES in S160), the ECU 70 temporarily terminates this process. The addition prohibition flag Fbucut is maintained to be OFF and the fuel addition is continued. This state is a state before timing t20 in the timing chart of FIG. 7.

When exhaust temperature thci becomes greater than or equal to the stop determination reference temperature Athc before the addition period count value Cud becomes greater than or equal to the maximum value Ut (NO in S158, t20 in FIG. 7), the ECU 70 sets the addition period count value Cud to the maximum value Ut in step S162. The ECU 70 sets the addition prohibition flag Fbucut ON in step S164 and temporarily terminates this process. As a result, the fuel addition for burn-up heating is stopped. This timing (t20) corresponds to the stop timing.

In the next control cycle, the addition prohibition flag Fbucut is ON(NO in S152). The ECU 70 decreases (e.g., decrements) the addition period count value Cud in step S166. Then, the ECU 70 determines whether the addition period count value Cud is greater than zero in step S168. In the initial stage of the control, the addition period count value Cud is less than zero (NO in S168). In step S172, the ECU 70 determines whether exhaust temperature thci is less than the stop determination reference temperature Athc. Immediately after timing t20 in FIG. 7, exhaust temperature thci is greater than or equal to the stop determination reference temperature Athc (NO in S172). In this case, the ECU 70 temporarily terminates this process. Thus, the state in which the fuel addition for burn-up heating is stopped continues.

Figure 7:
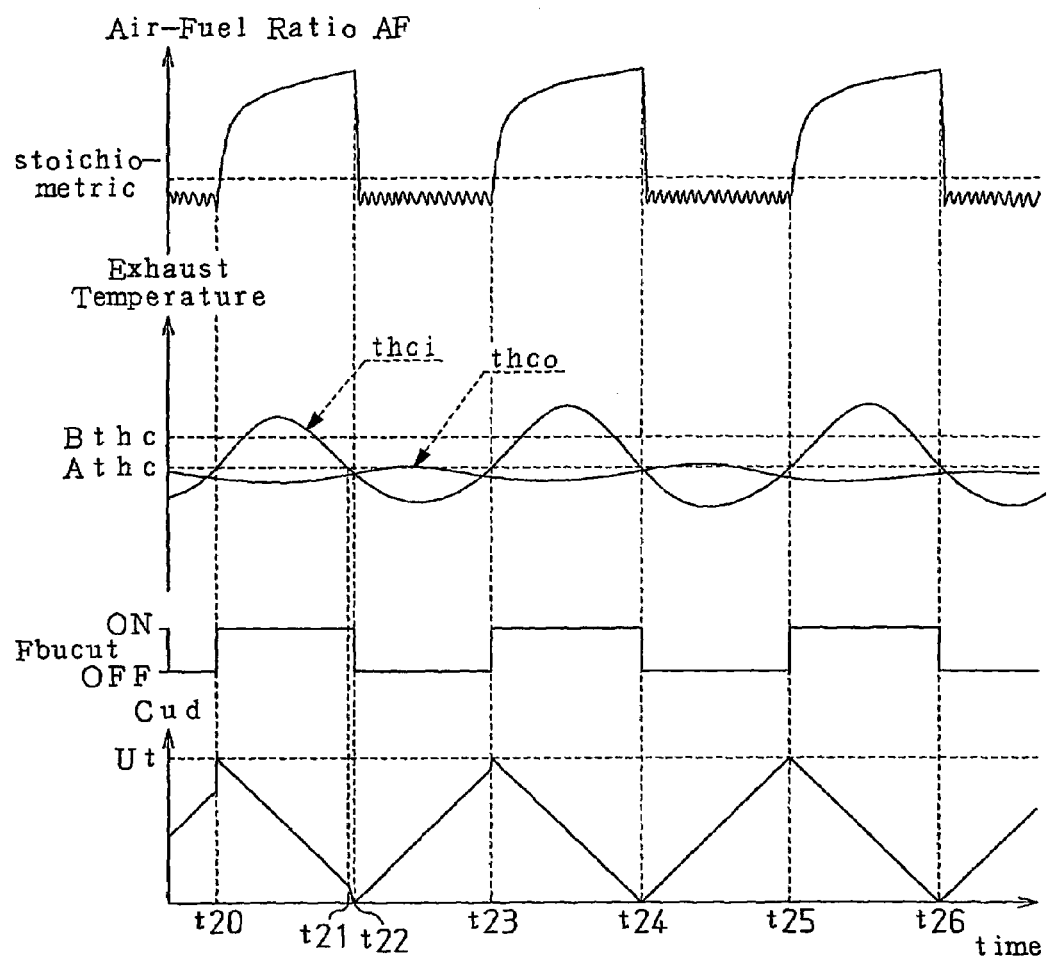

Referring now to FIG. 7, the exhaust temperature thci increases further after timing t20. However, a change in the exhaust temperature thco at the location downstream from the filter 38a is relatively small and the state in which the exhaust temperature thco is less than the stop determination reference temperature Bthc continues.

Afterwards, the exhaust temperature thci decreases and satisfies thci<Athc (YES in S172, t21). The exhaust temperature thco is less than the stop determination reference temperature Bthc (YES in S174), and the exhaust temperature thci has increased once (YES in S176). In step S178, the ECU 70 determines whether the addition period count value Cud is equal to zero. In the example of FIG. 7, the addition period count value Cud is greater than zero (NO in S178). Thus, the ECU 70 accelerates the decreasing of the addition period count value Cud in step S182.

To be specific, when the addition period count value Cud is decremented by one during normal decreasing, the ECU 70 decrements the addition period count value Cud by a value greater than one in a period in which the addition period count value Cud is greater than zero in control cycles after step S182 has been executed.

Thus, in the next and subsequent control cycles, the addition period count value Cud is decreased more rapidly than normal in a period in which the addition period count value Cud is greater than zero as shown in FIG. 7 (t21 to t22).

Afterwards, the processing in steps S166, S168, S170, and S182 is executed so that the addition period count value Cud rapidly reaches zero (t22 in FIG. 7). In this state, the exhaust temperature thci is less than the stop determination reference temperature Athc (YES in S172), the exhaust temperature thco is less than the stop determination reference temperature Bthc (YES in S174), the determination result in step S176 is YES, and the addition period count value Cud is equal to zero (YES in S178). Thus, the ECU 70 sets the addition prohibition flag Fbucut OFF in step S180. As a result, the ECU 70 starts the fuel addition for burn-up heating. This timing (t22) corresponds to the start timing.

In the next control cycle, the addition prohibition flag Fbucut is OFF (YES in S152). Thus, the ECU 70 executes the processing in steps S154 to S164. The example of FIG. 7 shows a case in which the exhaust temperature thci becomes greater than or equal to the stop determination reference temperature Athc before the addition period count value Cud becomes greater than or equal to the maximum value Ut (t23). In this case, the ECU 70 sets the addition period count value Cud to the maximum value Ut in step S162, and sets the addition prohibition flag Fbucut ON in step S164. As a result, the fuel addition for burn-up heating is stopped. This timing (t23) corresponds to the stop timing.

In the next control cycle, the addition prohibition flag Fbucut is ON(NO in S152). Thus, the ECU 70 executes the processing in steps S166 to S182. In the example of FIG. 7, exhaust temperature thci becomes less than the stop determination reference temperature Athc at the same time as when the addition period count value Cud reaches zero (t24). Thus, the ECU 70 sets the addition prohibition flag Fbucut OFF in step S180, and temporarily terminates this process. As a result, the fuel addition for burn-up heating is started. This timing (t24) corresponds to the start timing.

In the next control cycle, the addition prohibition flag Fbucut is OFF (YES in S152). Thus, the ECU 70 executes the processing in steps S154 to S164. In the example of FIG. 7, exhaust temperature thci becomes greater than or equal to the stop determination reference temperature Athc at the same time as when the addition period count value Cud reaches the maximum value Ut (t25). Thus, the ECU 70 determines step S156 as NO, sets the addition period count value Cud to the maximum value Ut in step S162, and sets the addition prohibition flag Fbucut ON in step S164. As a result, the fuel addition for burn-up heating is stopped. This timing (t25) corresponds to the stop timing.

In the next control cycle, the addition prohibition flag Fbucut is ON(NO in S152). Thus, the ECU 70 executes the processing in steps S166 to S182. In the example of FIG. 7, exhaust temperature thci becomes less than the stop determination reference temperature Athc at the same time as when the addition period count value Cud reaches zero (t26). Thus, the ECU 70 sets the addition prohibition flag Fbucut OFF in step S180 and temporarily terminates this process. As a result, the fuel addition for burn-up heating is started. This timing (t26) corresponds to the start timing. In this way, the ECU 70 intermittently adds fuel to the exhaust in the burn-up heating.

Figure 8:
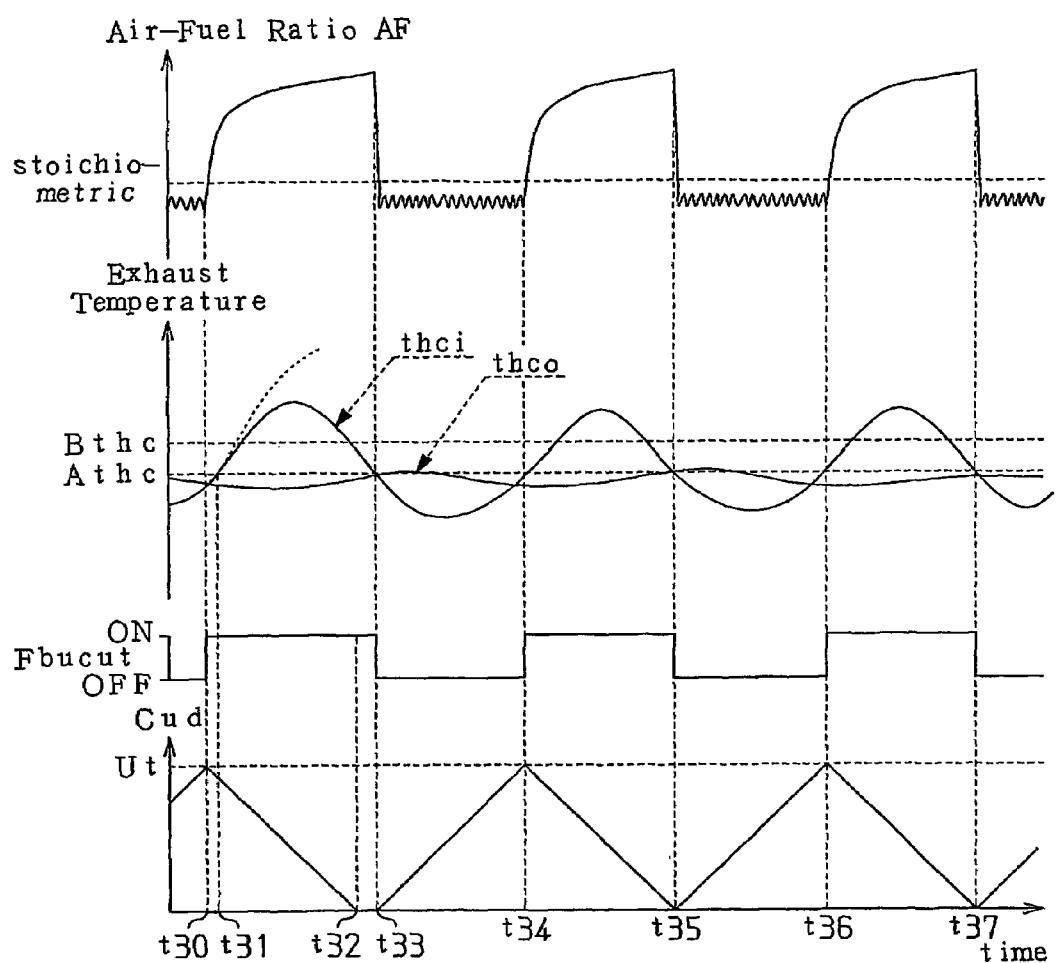

FIG. 8 shows a timing chart when the NOx storage reduction catalyst 36a is replaced by a new one.

Before timing t30, exhaust temperature thci is less than the stop determination reference temperature Athc (YES in S158), and exhaust temperature thco is less than the stop determination reference temperature Bthc (YES in S160). In this state, the ECU 70 is adding fuel to the exhaust. The addition period count value Cud continues to be increased so that Cud≧Ut is satisfied while thci<Athc and thco<Bthc remain satisfied (NO in S156, t30 in FIG. 8). Thus, the ECU 70 sets the addition period count value Cud to the maximum value Ut in step S162, sets the prohibition flag Fbucut ON in step S164, and temporarily terminates this process. As a result, the fuel addition for burn-up heating is stopped. This timing (t30) corresponds to the stop timing.

In the next control cycle, the addition prohibition flag Fbucut is ON(NO in S152). Thus, the ECU 70 decreases the addition period count value Cud in step S166. In step S168, the ECU 70 determines whether the addition period count value Cud is less than zero. In the initial stage of the control, the addition period count value Cud is greater than zero (NO in S168). In step S172, the ECU 70 determines whether exhaust temperature thci is less than the stop determination reference temperature Athc. Immediately after timing t30 in FIG. 8, exhaust temperature thci is less than the stop determination reference temperature Athc (YES in S172). In step S174, the ECU 70 determines whether exhaust temperature thco is less than the stop determination reference temperature Bthc. In this case, the exhaust temperature thco is less than the stop determination reference temperature Bthc (YES in S174). In step S176, the ECU 70 determines whether any one of the exhaust temperatures thci and thco has ever increased to be greater than or equal to the corresponding one of the stop determination reference temperatures Athc and Bthc. In other words, the ECU 70 determines whether the determination in any one of steps S172 and S174 has ever resulted in NO after The addition prohibition flag Fbucut was set to ON.

In this case, none of the exhaust temperatures thci and thco has ever increased to be greater than or equal to the corresponding one of the stop determination reference temperatures Athc and Bthc (NO in S176). Thus, the ECU 70 temporarily terminates this process. Accordingly, the state in which the fuel addition for burn-up heating is stopped continues.

As a result, the temperature of the exhaust discharged from the NOx storage reduction catalyst 36a increases further and satisfies thci≧Athc (t31 in FIG. 8). The ECU 70 determines step S172 as NO and temporarily terminates this process. At this time, the state in which the fuel addition for burn-up heating is stopped continues.

Afterwards, the exhaust temperature thco downstream from the filter 38a does not change greatly and the state in which exhaust temperature thco is less than the stop determination reference temperature Bthc continues. The exhaust temperature thci downstream from the NOx storage reduction catalyst 36a reaches its maximum temperature, and decreases to approach the stop determination reference temperature Athc. However, there may be a case in which the addition period count value Cud becomes less than or equal to zero before exhaust temperature thci becomes less than The stop determination reference temperature Athc as shown in FIG. 8 (t32). In this case, the processing in steps S166 to 170 is executed so that the addition period count value Cud is maintained to be equal to zero during timings t32 to t33. Also, because the exhaust temperature thci is greater than or equal to the stop determination reference temperature Athc (NO in S172), the addition prohibition flag Fbucut is maintained to be ON.

Then, the exhaust temperature thci decreases and satisfies thci<Athc (YES in S172, t33 in FIG. 8). The exhaust temperature thco is less than the stop determination reference temperature Bthc (YES in S174), and the exhaust temperature has once increased (YES in S176). The ECU 70 determines whether the addition period count value Cud is equal to zero in step S178. Because the addition period count value Cud is equal to zero (YES in S178), the ECU 70 sets the addition prohibition flag Fbucut OFF in step S180 and temporarily terminates this process. As a result, the fuel addition for burn-up heating is started. This timing (t33) corresponds to the start timing.

In the next control cycle, the addition prohibition flag Fbucut is OFF (YES in S152). Thus, the ECU 70 executes the processing in steps S154 to S164. In the example of FIG. 8, exhaust temperature thci becomes greater than or equal to the stop determination reference temperature Athc at the same time as when the addition period count value Cud becomes greater than or equal to the maximum value Ut (t34). In this case (NO in S156), the ECU 70 sets the addition period count value Cud to the maximum value Ut in step S162 and sets the addition prohibition flag Fbucut ON in step S164. As a result, the fuel addition for burn-up heating is stopped. This timing (t34) corresponds to the stop timing.

In the next control cycle, the addition prohibition flag Fbucut is ON(NO in S152). Thus, the ECU 70 executes the processing in steps S166 to S182. In the example of FIG. 8, exhaust temperature thci becomes less than the stop determination reference temperature Athc at the same time as when the addition period count value Cud reaches zero (t35). Thus, the determinations in steps S172 to S178 result in YES, and the ECU 70 sets the addition prohibition flag Fbucut OFF in step S180 and temporarily terminates this process. As a result, the fuel addition for burn-up heating is started. This timing (t35) corresponds to the start, timing.

In the example of FIG. 8, the subsequent timings (t36 and t38) are the same as the case described above.

If the start timing and the stop timing are determined based only on the comparison between the exhaust temperature thci and the stop determination reference temperature Athc unlike in this embodiment, the exhaust temperature thci may further increase, for example, after timing t31 as indicated by the broken line, and the NOx storage reduction catalyst 36a may be overheated.

Figure 9:
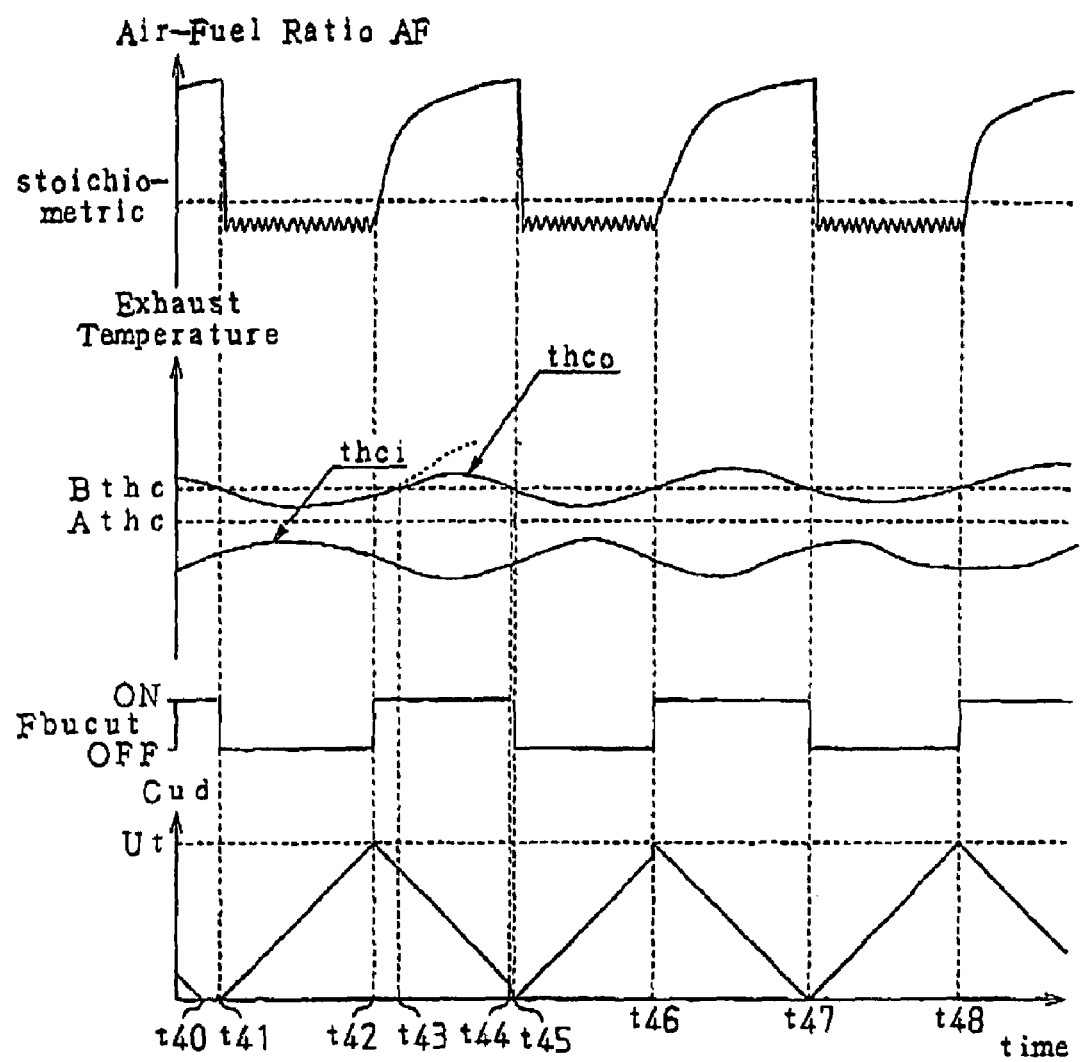

FIG. 9 shows a case in which deterioration of the NOx storage reduction catalyst 36a progresses and the exhaust temperature thco at the location downstream from the filter 38a increases to be greater than or equal to the stop determination reference temperature Bthc. In the same manner as in the determination relating to the exhaust temperature thci at the location downstream from the NOx storage reduction catalyst 36a (FIGS. 7 and 8), the ECU 70 sets the addition prohibition flag Fbucut ON or OFF based on the addition period count value Cud and the exhaust temperature thco. With the addition prohibition flag Fbucut set in this way, the start timing (t41, t45, and t47) and the stop timing (t42, t46, and t48) are determined.

If the start timing and the stop timing are determined based only on the comparison between the exhaust temperature thco and the stop determination reference temperature Bthc unlike in this embodiment, the exhaust temperature thco may further increase, for example, after timing t43 as indicated by the broken line, and the filter 38a may be overheated.

The first exhaust temperature sensor 44 and the second exhaust temperature sensor 46 serve as an exhaust temperature detector. In the burn-up heating (FIG. 4), the processing in steps S154 to S164 serves as processing for a stop timing determination section, and the processing in steps S166 to S182 serves as a processing for a start timing determination section. A period required for the addition period count value Cud to reach the maximum value Ut by the increasing of the addition period count value Cud (S154) serves as a stop determination reference period. A period required for the addition period count value Cud to reach zero by the decreasing of the addition period count value Cud (S166) serves as a start determination reference period. The stop determination reference temperatures Athc and Bthc also serve as start determination reference temperatures.

The first embodiment has the advantages described below.

(1) The ECU 70 determines the timing at which the intermittent fuel addition to the exhaust is stopped based on the elapsed time in which the intermittent fuel addition to the exhaust is being performed. To be specific, the ECU 70 stops the intermittent fuel addition to the exhaust when the addition period count value Cud is less than the maximum value Ut and any one of the exhaust temperatures thci and thco becomes higher than the corresponding one of the stop determination reference temperatures Athc and Bthc. In this way, the temperature of the exhaust purification apparatus is prevented from excessively increasing.

The ECU 70 stops the fuel addition to the exhaust when the addition period count value Cud reaches the maximum value Ut even when both the exhaust temperatures thci and thco are less than the corresponding stop determination reference temperatures Athc and Bthc. This limits the period in which fuel is being added and the exhaust temperatures thci and thco is being increased. Thus, the temperature of the exhaust purification apparatus is prevented from excessively increasing.

As a result, even when the NOx storage reduction catalyst 36a and the filter 38a deteriorate to a different degree, or even when detection errors occur in the first exhaust temperature sensor 44 and the second exhaust temperature sensor 46, the exhaust purification apparatus is prevented from being overheated in the burn-up heating.

(2) The ECU 70 determines the timing at which the intermittent fuel addition to the exhaust is started based on the elapsed time in which the intermittent fuel addition to the exhaust is not being performed. To be specific, the ECU 70 starts the intermittent fuel addition to the exhaust when both the exhaust temperatures thci and thco become higher than the corresponding start determination reference temperatures (the stop determination reference temperatures Athc and Bthc are used) and the addition period count value Cud reaches zero. This is because the occurrence of overheating is extremely unlikely and the temperature of the exhaust purification apparatus is likely to decrease greatly when both the exhaust temperatures thci and thco become less than the corresponding start determination reference temperatures and the addition period count value Cud reaches zero. In this way, the temperature of the exhaust purification apparatus is prevented from excessively decreasing. This prevents the fuel efficiency from being decreased even though the temperature of the NOx storage reduction catalyst 36a and the filter 38a is increased.

(3) The ECU 70 assumes that the start timing of an appropriate addition period is close when both the exhaust temperatures thci and thco become less than the start determination reference temperatures (stop determination reference temperatures Athc and Bthc). Accordingly, the ECU 70 executes the processing in step S182 to accelerate the decreasing of the addition period count value Cud so that the addition period count value Cud rapidly reaches zero. As a result, the addition period is started at an appropriate timing. This enables the ECU 70 to control the temperature of the exhaust purification apparatus more appropriately.

(4) As shown in FIGS. 5 and 6, the ECU 70 performs the burn-up heating when the estimated accumulation amount PMsm decreases to be less than or equal to the normal burn-up start determination value NBUpm or the special burn-up start determination value SBUpm. The normal burn-up start determination value NBUpm and the special burn-up start determination value SBUpm are relatively close to the termination determination value PMend. In other words, the ECU 70 performs the burn-up heating in a stage close to the final stage of the processing for eliminating PM accumulated in the exhaust purification apparatus by continuously adding fuel to the exhaust system in the regeneration control (FIG. 3). In this stage, the estimated accumulation amount PMsm is sufficiently small (that is, the amount of PM accumulated in the exhaust purification apparatus is small). Thus, even if the PM is burned rapidly by the burn-up heating (FIG. 4), the exhaust purification apparatus is prevented from being overheated.

A regeneration controller for an exhaust purification apparatus of an internal combustion engine according to a second embodiment of the present invention will now be described.

In the second embodiment, the ECU 70 changes the changing rate of the addition period count value Cud according to the driving state of the diesel engine 2. Except for this point, the regeneration controller of the second embodiment has the same structure as that of the first embodiment.

Figure 10:
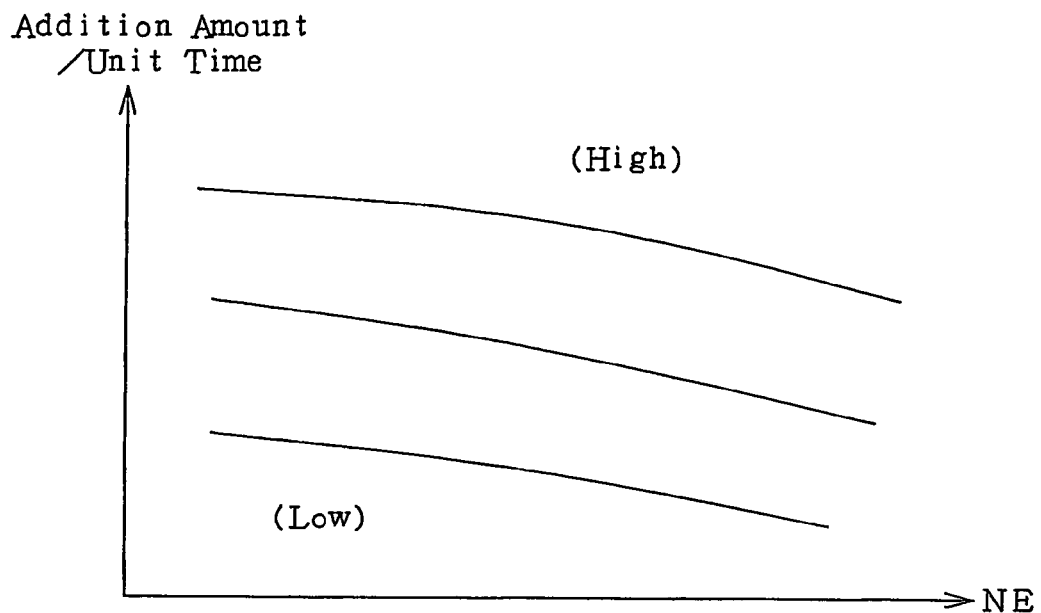
FIG. 10 is a schematic diagram of a map MAPup for setting the increase speed of an addition period count value Cud according to a second embodiment of the present invention.

In step S154, the ECU 70 sets the increasing speed of the addition period count value Cud based on the map MAPup shown in FIG. 10. To be specific, the increasing speed of the addition period count value Cud is set according to the amount of fuel added from the fuel adding valve 68 per unit time and the engine speed NE. In this way, the ECU 70 changes the stop determination reference period required for the addition period count value Cud to reach the maximum value Ut according to the engine driving state.

Figure 11:
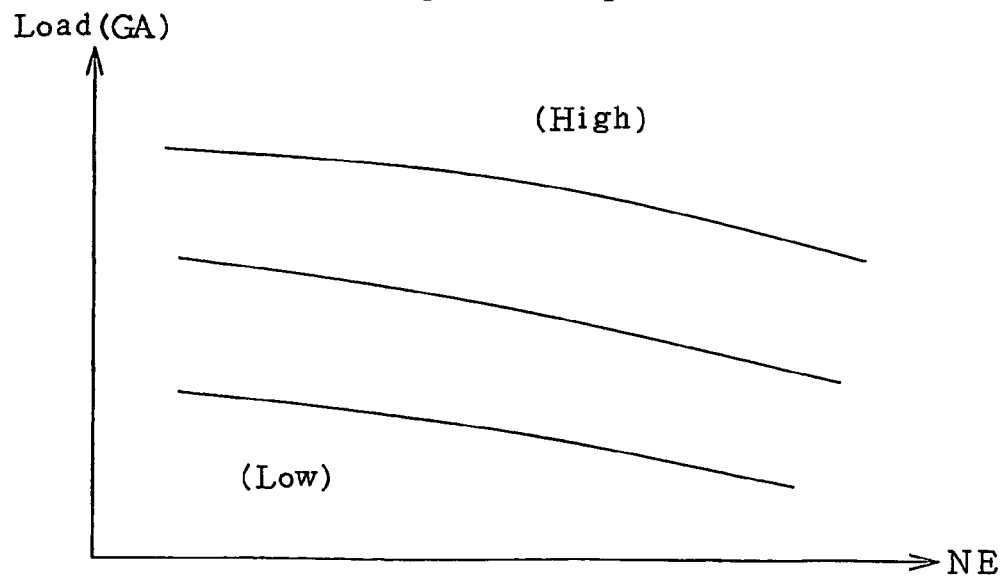
FIG. 11 is a schematic diagram of a map MAPdwn for setting the decrease speed of the addition period count value Cud in the second embodiment.

In step S166, the ECU 70 sets the decreasing speed of the addition period count value Cud based on the map MAPdwn shown in FIG. 11. To be specific, the decreasing speed of the addition period count value Cud is set according to the load (e.g., the intake air amount GA) and the engine speed NE. In this way, the ECU 70 changes the start determination reference period required for the addition period count value Cud to reach zero according to the engine driving state.

In addition to advantages (1) to (4) of the first embodiment, the second embodiment has the advantage described below.

(5) The ECU 70 changes the stop determination reference period and the start determination reference period according to the driving state of the diesel engine 2. This enables the temperature of the exhaust purification apparatus to be controlled more appropriately.

A regeneration controller for an exhaust purification apparatus of an internal combustion engine according to a third embodiment of the present invention will now be described.

Figure 12:
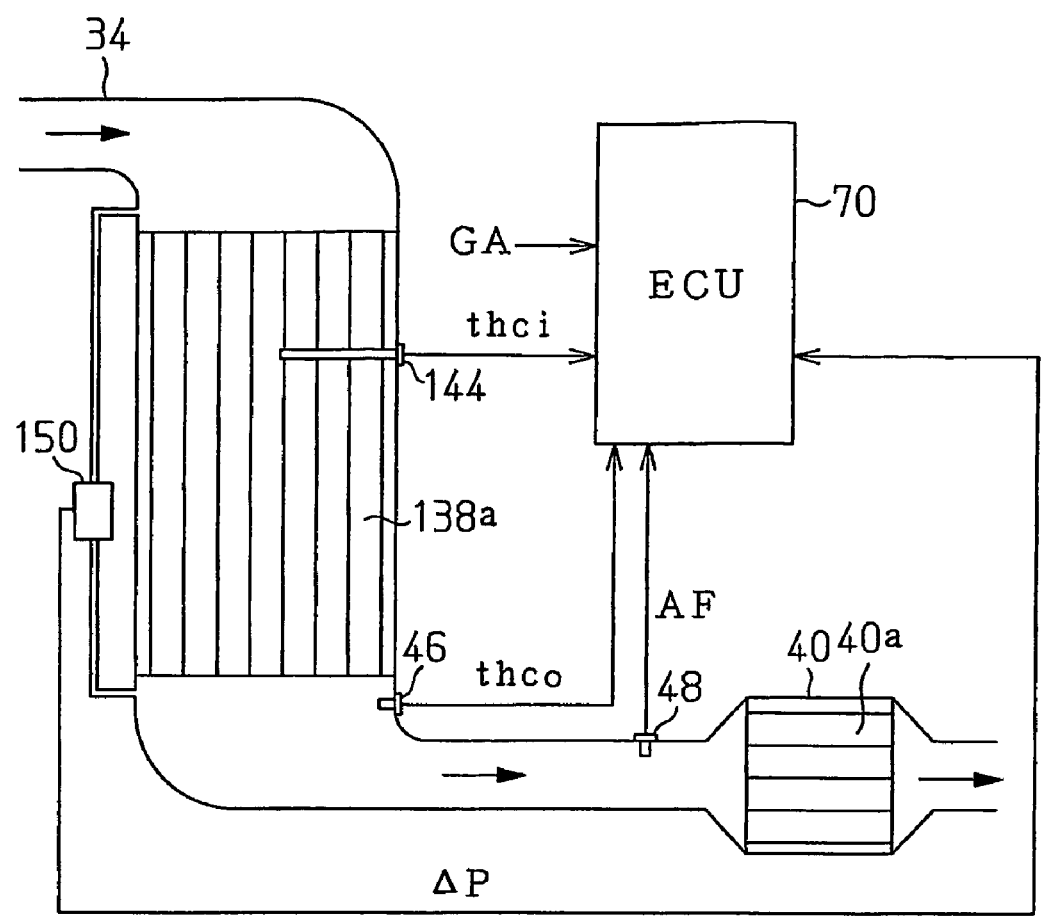
FIG. 12 is a schematic diagram of an exhaust purification apparatus according to a third embodiment of the present invention.

In the third embodiment, a single filter 138*a* having a base coated with a layer of a NOx storage reduction catalyst, as shown in FIG. 12, is used instead of the two catalytic converters described in the first embodiment, namely, the first catalytic converter and the second catalytic converter. A pressure difference sensor 150 detects the pressure difference ΔP between the upstream and downstream sides of the filter 138*a*. A first exhaust temperature sensor 144 detects the temperature (exhaust temperature thci) of the exhaust in the filter 138*a*. A second exhaust temperature sensor 46, an air-fuel ratio sensor 48, a third catalytic converter 40, and an oxidation catalyst 40*a* are identical to the corresponding components in the first embodiment and are given the same reference numerals as those components. The other parts are the same as the first embodiment and the second embodiment.

The first exhaust temperature sensor 144 detects the exhaust temperature thci at a central portion of the filter 138*a*. The second exhaust temperature sensor 46 detects the exhaust temperature thco at a location downstream from the filter 138*a*, which serves as the exhaust purification apparatus.

The structure of the third embodiment also has the same advantages as the first and second embodiments. That is, even when each portion of the filter 138*a* deteriorates to a different degree or even when detection errors occur in the first exhaust temperature sensor 44 and the second exhaust temperature sensor 46, each portion of the filter 138*a* is prevented from being overheated.

It should be apparent to those skilled in the art that the present invention may be embodied in many other specific forms without departing from the spirit or scope of the invention. Particularly, it should be understood that the present invention may be embodied in the following forms.

In each of the above embodiments, the ECU 70 repeatedly starts and stops fuel addition to the exhaust system in burn-up heating. In other words, the ECU 70 performs intermittent fuel addition in burn-up heating. Alternatively, the ECU 70 may repeatedly add fuel with a high concentration and fuel with a low concentration in burn-up heating. In other words, the ECU 70 may perform intermittent increase of fuel addition in burn-up heating.

In each of the above embodiments, the normal burn-up start determination value NBUpm and the special burn-up start determination value SBUpm are greater than the termination determination value PMend. Alternatively, one or both of the normal burn-up start determination value NBUpm and the special burn-up start determination value SBUpm may be the same as the termination determination value PMend. That is, the burn-up heating (FIG. 4) may be performed in the final stage of the regeneration control (FIG. 3).

In each of the above embodiments, the ECU 70 accelerates the decreasing of the addition period count value Cud in step S182. Alternatively, the ECU 70 may directly set the addition period count value Cud to zero in step S182.

The present examples and embodiments are to be considered as illustrative and not restrictive, and the invention is not to be limited to the details given herein, but may be modified within the scope and equivalence of the appended claims.

The invention claimed is:

1. A regeneration controller for an exhaust purification apparatus that is arranged in an exhaust system of an internal combustion engine, wherein the regeneration controller burns particulate matter in the exhaust purification apparatus by intermittently adding fuel to the exhaust system or by intermittently increasing the amount of fuel added to the exhaust system, the regeneration controller comprising:

a first heating control and a second heating control adapted for execution by the regeneration controller, the first heating control generates an oxygen-rich, fuel-lean, environment while increasing temperature of the catalyst bed, the second heating control intermittently generates a fuel-rich environment and an oxygen-rich, fuel lean, environment while increasing temperature of the catalyst bed;

an exhaust temperature detector for detecting exhaust temperature at a location downstream from the exhaust purification apparatus;

a stop timing determination section for determining a timing for stopping the fuel addition to the exhaust system or the increase of fuel addition to the exhaust system executed by the second heating control based on the exhaust temperature detected by the exhaust temperature detector and an elapsed time of the fuel addition to the exhaust system or the increase of fuel addition to the exhaust system; and a start timing determination section for determining a timing for starting the fuel addition to the exhaust system or the increase of fuel addition to the exhaust system based on the exhaust temperature detected by the exhaust temperature detector and an elapsed time in which there is no fuel addition to the exhaust system or in which there is no increase of fuel addition to the exhaust system;

wherein the stop timing determination section stops the fuel addition to the exhaust system or the increase of fuel addition to the exhaust system when at least one of the exhaust temperature detected by at least one of the exhaust temperature detector is greater than a stop determination reference temperature or when the elapsed time of the fuel addition to the exhaust system or the increase of fuel addition to the exhaust system is longer than a stop determination reference period, wherein the start timing determination section staffs the fuel addition to the exhaust system or the increase of fuel addition to the exhaust system when each of at least one of the exhaust temperature detected by at least one of the exhaust temperature detector is less than a start determination reference temperature and the elapsed time of the fuel addition to the exhaust system or the increase of fuel addition to the exhaust system is longer than a start determination reference period, wherein both the exhaust temperature and the elapsed time are monitored to control the stop timing determination section and the staff timing section under the second heating control, and wherein the temperature of a NOx storage reduction catalyst under the burn-up is higher than the temperature of the catalyst before performing the burn-up.

2. The regeneration controller according to claim 1, wherein:

the exhaust purification apparatus is one of a plurality of exhaust purification apparatuses that are arranged in the exhaust system of the internal combustion engine; and the exhaust temperature detector detects an exhaust temperature at a location downstream from a corresponding one of the exhaust purification apparatuses.

3. The regeneration controller according to claim 1, further comprising:

another exhaust temperature detector for detecting exhaust temperature in the exhaust purification apparatus.

4. The regeneration controller according to claim 1, wherein the stop timing determination section sets the stop determination reference period according to a driving state of the internal combustion engine.

5. The regeneration controller according to claim 1, wherein the start timing determination section sets the start determination reference period according to a driving state of the internal combustion engine.

6. The regeneration controller according to claim 1, wherein the start timing determination section measures the elapsed time of the fuel addition to the exhaust system or the increase of fuel addition to the exhaust system with a count value, and accelerates the changing rate of the count value of the elapsed time when all of one or more exhaust temperatures detected by one or more exhaust temperature detectors are lower than the start determination reference temperature and the elapsed time of in which there is no fuel addition to the exhaust system or in which there is no increase of fuel addition to the exhaust system is shorter than the start determination reference period.

7. The regeneration controller according to claim 1, wherein the regeneration controller executes processing for eliminating particulate matter accumulated in the exhaust purification apparatus by continuously adding fuel to the exhaust system, and burns particulate matter in the exhaust purification apparatus by the intermittent fuel addition to the exhaust system or the intermittent increase of fuel addition to the exhaust system in a final stage of the processing of continuous fuel addition to the exhaust system or in a stage close to the final stage.

8. The regeneration controller according to claim 1, wherein the exhaust purification apparatus includes:

a filter for eliminating particulate matter contained in exhaust; and a layer of the NOx storage reduction catalyst formed on the filter.

9. The regeneration controller according to claim 1, wherein the exhaust system includes:

a first exhaust purification apparatus including the NOx storage reduction catalyst; and a second exhaust purification apparatus including a filter for eliminating particulate matter contained in exhaust and a layer of the NOx storage reduction catalyst formed on the filter, the second exhaust purification apparatus being arranged downstream from the first exhaust purification apparatus.

10. The regeneration controller according to claim 1, wherein the regeneration controller estimates an amount of particulate matter in the exhaust purification apparatus and starts the intermittent fuel addition to the exhaust system or the intermittent increase of fuel addition to the exhaust system when the estimated amount of particulate matter is less than or equal to a predetermined amount.

11. A regeneration controller for an exhaust purification apparatus that is arranged in an exhaust system of an internal combustion engine, wherein the regeneration controller burns particulate matter in the exhaust purification apparatus by intermittently adding fuel to the exhaust system or by intermittently increasing the amount of fuel added to the exhaust system, the regeneration controller comprising:

a first heating control and a second heating control adapted for execution by the regeneration controller, the first heating control generates an oxygen-rich, fuel-lean, environment while increasing temperature of the catalyst bed, the second heating control intermittently generates a fuel-rich environment and an oxygen-rich, fuel lean, environment while increasing temperature of the catalyst bed;

an exhaust temperature detector for detecting exhaust temperature at a location downstream from the exhaust purification apparatus;

a stop timing determination section for determining a timing for stopping the fuel addition to the exhaust system or the increase of fuel addition to the exhaust system executed by the second heating control based on the exhaust temperature detected by the exhaust temperature detector and an elapsed time of the fuel addition to the exhaust system or the increase of fuel addition to the exhaust system;

a start timing determination section for determining a timing for starting the fuel addition to the exhaust system or the increase of fuel addition to the exhaust system based on the exhaust temperature detected by the exhaust temperature detector and an elapsed time in which there is no fuel addition to the exhaust system or in which there is no increase of fuel addition to the exhaust system; and the exhaust system comprises:

a first exhaust purification apparatus including the NOx storage reduction catalyst; and a second exhaust purification apparatus including a filter for eliminating particulate matter contained in exhaust and a layer of the NOx storage reduction catalyst formed on the filter, the second exhaust purification apparatus being arranged downstream from the first exhaust purification apparatus, wherein the stop timing determination section stops the fuel addition to the exhaust system or the increase of fuel addition to the exhaust system when at least one of the exhaust temperature detected by at least one of the exhaust temperature detector is greater than a stop determination reference temperature or when the elapsed time of the fuel addition to the exhaust system or the increase of fuel addition to the exhaust system is longer than a stop determination reference period, wherein the start timing determination section staffs the fuel addition to the exhaust system or the increase of fuel addition to the exhaust system when each of at least one of the exhaust temperature detected by at least one of the exhaust temperature detector is less than a start determination reference temperature and the elapsed time of the fuel addition to the exhaust system or the increase of fuel addition to the exhaust system is longer than a start determination reference period, wherein both the exhaust temperature and the elapsed time are monitored to control the stop timing determination section and the staff timing section under the second heating control, and wherein the temperature of a NOx storage reduction catalyst under the burn-up is higher than the temperature of the catalyst before performing the burn-up.

12. A regeneration controller for an exhaust purification apparatus that is arranged in an exhaust system of an internal combustion engine, wherein the regeneration controller burns particulate matter in the exhaust purification apparatus by intermittently adding fuel to the exhaust system or by intermittently increasing the amount of fuel added to the exhaust system, the regeneration controller comprising:

a particulate matter elimination heating control for eliminating particulate matter accumulated in the exhaust purification apparatus;

a burn-up heating control in a final stage of the particulate matter elimination heating control, or in a stage close to the final stage, for burning particulate matter in the exhaust purification apparatus by intermittently adding fuel to the exhaust system or by intermittently increasing the amount of fuel added to the exhaust system;

an exhaust temperature detector for detecting exhaust temperature at a location downstream from the exhaust purification apparatus;

a stop timing determination section for determining a timing for stopping the fuel addition to the exhaust system or the increase of fuel addition to the exhaust system executed by the burn-up heating control based on the exhaust temperature detected by the exhaust temperature detector and an elapsed time of the fuel addition to the exhaust system or the increase of fuel addition to the exhaust system; and a start timing determination section for determining a timing for starting the fuel addition to the exhaust system or the increase of fuel addition to the exhaust system based on the exhaust temperature detected by the exhaust temperature detector and an elapsed time in which there is no fuel addition to the exhaust system or in which there is no increase of fuel addition to the exhaust system;

wherein the stop timing determination section stops the fuel addition to the exhaust system or the increase of fuel addition to the exhaust system when at least one of the exhaust temperature detected by at least one of the exhaust temperature detector is greater than a stop determination reference temperature or when the elapsed time of the fuel addition to the exhaust system or the increase of fuel addition to the exhaust system is longer than a stop determination reference period, wherein the start timing determination section staffs the fuel addition to the exhaust system or the increase of fuel addition to the exhaust system when each of at least one of the exhaust temperature detected by at least one of the exhaust temperature detector is less than a start determination reference temperature and the elapsed time of the fuel addition to the exhaust system or the increase of fuel addition to the exhaust system is longer than a start determination reference period, wherein both the exhaust temperature and the elapsed time are monitored to control the stop timing determination section and the start timing section under the burn-up heating control, and wherein the temperature of a NOx storage reduction catalyst under the burn-up is higher than the temperature of the catalyst before performing the burn-up.

* * * * *

UNITED STATES PATENT AND TRADEMARK OFFICE
CERTIFICATE OF CORRECTION

PATENT NO.        : 7,600,373 B2
APPLICATION NO.   : 10/548395
DATED             : October 13, 2009
INVENTOR(S)       : Shigehiro Matsuno et al.

It is certified that error appears in the above-identified patent and that said Letters Patent is hereby corrected as shown below:

| Column | Line | |
|---|---|---|
| 1 | 59 | Change "increase" to --increases--. |
| 5 | 50 | After "referred" insert --to--. |
| 12 | 20 | Change "The" to --the--. |
| 12 | 42 | After "than" change "The" to --the--. |
| 13 | 18 | Change "start, timing" to --start timing--. |
| 17 Claim 1 | 4 | Change "staffs" to --starts--. |

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,600,373 B2 | Page 1 of 1 |
| APPLICATION NO. | : 10/548395 | |
| DATED | : October 13, 2010 | |
| INVENTOR(S) | : Matsuno et al. | |

It is certified that error appears in the above-identified patent and that said Letters Patent is hereby corrected as shown below:

Title Page, should read (*) Notice: Subject to any disclaimers, term of this patent is extended or adjusted under 35 U.S.C. 154(b) by 0 days.

Signed and Sealed this

Twenty-seventh Day of July, 2010

David J. Kappos
*Director of the United States Patent and Trademark Office*